United States Patent
Chen et al.

(10) Patent No.: US 11,316,317 B2
(45) Date of Patent: Apr. 26, 2022

(54) HIGH POWER AND MULTIPLE WAVELENGTH RAMAN LASER OF VISIBLE LIGHT

(71) Applicant: Lightmed Corporation, New Taipei (TW)

(72) Inventors: Yung-Fu Chen, New Taipei (TW); Hsing-Chih Liang, New Taipei (TW); Chia-Han Tsou, New Taipei (TW)

(73) Assignee: Lightmed Corporation, New Taipei (TW)

( * ) Notice: Subject to any disclaimer, the term of this patent is extended or adjusted under 35 U.S.C. 154(b) by 2 days.

(21) Appl. No.: 16/777,971

(22) Filed: Jan. 31, 2020

(65) Prior Publication Data
US 2020/0366047 A1 Nov. 19, 2020

(30) Foreign Application Priority Data

May 16, 2019 (TW) .................................. 108116967

(51) Int. Cl.
*H01S 3/30* (2006.01)
*H01S 3/094* (2006.01)
(Continued)

(52) U.S. Cl.
CPC ...... *H01S 3/094096* (2013.01); *H01S 3/0092* (2013.01); *H01S 3/0602* (2013.01);
(Continued)

(58) Field of Classification Search
None
See application file for complete search history.

(56) References Cited

U.S. PATENT DOCUMENTS

| 2008/0259969 A1* | 10/2008 | Piper | H01S 3/1086 372/3 |
| 2009/0154509 A1* | 6/2009 | Suzuki | B23K 26/064 372/22 |

(Continued)

FOREIGN PATENT DOCUMENTS

| CN | 105633786 A | 6/2016 |
| CN | 110556702 A * | 12/2019 |

(Continued)

OTHER PUBLICATIONS

Lee et al. ("A wavelength versatile, continuous wave, self-raman solid state laser operating in the visible", Optics Express, vol. 18, No. 19, Sep. 13, 2010) (Year: 2010).*

(Continued)

*Primary Examiner* — Tod T Van Roy
(74) *Attorney, Agent, or Firm* — Volpe Koenig

(57) ABSTRACT

A multi-wavelength laser device equipped with a linear cavity along which a first direction and a second direction opposite to the first direction are defined is disclosed. The apparatus includes, along the first direction, a first optical component, a gain and Raman medium, a sum frequency generation crystal, a first second-harmonic generation crystal and a second optical component. The first optical component allows a pumping light to transmit therethrough and be incident in the first direction. The gain and Raman medium receives the pumping light from the first optical component and generates a first infrared base laser light having a first wavelength and a second infrared base laser light having a second wavelength. The first and second optical components form a laser cavity for oscillation of these two infrared base laser lights. The sum frequency generation crystal receives the first and second infrared base laser lights and generates a first visible laser light having a third wavelength. The first second-harmonic generation (Continued)

crystal receives the first infrared base laser light and generates a second visible laser light having a fourth wavelength. The second optical element allows the first and the second visible laser lights to emit out along the first direction.

7 Claims, 10 Drawing Sheets

(51) Int. Cl.
| | |
|---|---|
| H01S 3/06 | (2006.01) |
| H01S 3/00 | (2006.01) |
| H01S 3/16 | (2006.01) |
| H01S 3/109 | (2006.01) |
| H01S 3/08 | (2006.01) |
| H01S 3/108 | (2006.01) |

(52) U.S. Cl.
CPC ............ *H01S 3/0809* (2013.01); *H01S 3/108* (2013.01); *H01S 3/109* (2013.01); *H01S 3/1086* (2013.01); *H01S 3/1611* (2013.01); *H01S 3/1671* (2013.01); *H01S 3/30* (2013.01); *H01S 3/0621* (2013.01); *H01S 3/1673* (2013.01)

(56) References Cited

U.S. PATENT DOCUMENTS

2010/0054284 A1* 3/2010 Dekker ................. H01S 3/1086 372/3
2012/0113994 A1* 5/2012 Georges ................ H01S 3/1086 372/3

FOREIGN PATENT DOCUMENTS

| JP | 2007266537 A | 10/2007 | |
| JP | 2009533847 A | 9/2009 | |
| WO | WO-2006032110 A1 * | 3/2006 | ........... H01S 3/1086 |

OTHER PUBLICATIONS

Notification of Reasons for Refusal issued in corresponding Japanese Patent Appln. No. 2020-8705 dated Mar. 15, 2021, consisting of 6 pp.

* cited by examiner

HIGH POWER AND MULTIPLE WAVELENGTH RAMAN LASER OF VISIBLE LIGHT

CROSS-REFERENCE TO RELATED APPLICATION AND CLAIM OF PRIORITY

The application claims the benefit of Taiwan Patent Application No. 108116967, filed on May 16, 2019, at the Taiwan Intellectual Property Office, the disclosures of which are incorporated herein in their entirety by reference.

FIELD OF THE INVENTION

The present invention is related to a Raman laser apparatus, and more particularly to a Raman laser for generating high-power and multiple-wavelength laser light with visible wavelengths.

BACKGROUND OF THE INVENTION

Laser light with visible wavelengths (about 390-700 nanometers) has a high practical value, and it is now appearing in the fields of industrial processing and medical technology applications.

A conventional laser device 10 for generating laser light of visible wavelengths is shown in FIG. 1, in which the pumping light $L_{pump}$ having a wavelength of 808 nm is supplied from the diode laser source 1 at the leftmost in the figure through the first lens 3 into a linear cavity formed by the first lens 3 and the second lens 5. A gain medium 7 and a frequency-doubling crystal 9 are sequentially disposed in the cavity. The substance in the gain medium 7 absorbs the incident pumping light $L_{pump}$ and emits an infrared base laser light $L_{base}$ having a wavelength of about 1064 nm through energy level conversion.

Since the first lens 3 and the second lens 5 are highly reflective to the infrared base laser light $L_{base}$, they are reflected back and forth in the linear cavity formed by the first lens 3 and the second lens 5. For example, when incident on the surface of the second lens 5 to the right, it is reflected by the second lens 5 to become the infrared-based laser light $L'_{base}$ in the opposite direction, penetrating the frequency doubling crystal 9 and the gain medium 7 all the way to the left and projecting on the surface of the first lens 3, and is further reflected by the first lens 3 to become the infrared-based laser light L" base toward the right direction. The gain medium 7 can continuously generate the infrared base laser light $L_{base}$ travelling to and fro in the linear cavity due to the light energy continuously provided by the pumping light $L_{pump}$.

After receiving the infrared base laser light $L_{base}$ having a wavelength of about 1064 nm, the frequency-doubling crystal 9 can generate a visible laser light L1 having a wavelength of 532 nm through frequency doubling, and the visible laser light L1 can be made to and fro in the linear cavity. However, the second lens 5 has a better penetrating property to the visible laser light L1 having a wavelength of 532 nm, and allows a part of the visible laser light L1 to pass therethrough. The wavelength of 532 nm is located in the commonly used visible light region, so it has a high application value.

Nonetheless, the above-described device configuration often leads to a problem of insufficient power. Because the visible laser light L'1 may also be incident toward the left and enter the gain medium 7, a part of the material in the gain medium 7 having absorbed the incident visible laser light L'1 can no longer continue to absorb the incident pumping light $L_{pump}$ and further releases the infrared base laser light $L_{base}$. That is to say, the frequency-doubled visible laser light L'1 projecting toward the left causes the function of the gain medium 7 to be attenuated, eventually resulting in insufficient power of the laser device 10, and it is difficult to achieve the output of the watt level. In order to increase the output power, the laser device 10 as shown in FIG. 1 needs to continuously increase the power of the incident pump light $L_{pump}$ during operation. Such a device is inefficient and results in severe energy loss.

In addition, some attempts have been made to avoid the function attenuation of the gain medium 7 caused by the frequency-doubled laser light L'1 by means of changing the cavity structure, for example, changing the linear cavity to a complex shape like a dogleg, but optical loss after adding optical components is hard to avoid.

In some applications, such as medical procedures, multiple wavelengths of visible laser lights are often required simultaneously to provide timely switching. The traditional way is to provide laser lights of different wavelengths from different laser devices to be selected, so the costs of the laser devices in terms of both purchasing and space are obviously to be overcome.

In order to overcome the drawbacks set forth above in the prior art, a new design for the laser apparatus is required.

SUMMARY OF THE INVENTION

The present invention provides a high power multi-wavelength visible light Raman laser having a linear cavity, which can effectively overcome the deficiencies of the prior arts, and can also provide two or more visible laser lights, thereby greatly reducing power loss and the cost.

In accordance with one aspect of the present invention, a multi-wavelength laser with a linear cavity having a first direction and a second direction opposite to the first direction is provided. Along the first direction, the linear cavity includes: a first optical component, a gain and Raman medium, a sum frequency generation crystal, a first second-harmonic generation crystal, and a second optical element. The first optical component allows a pumping light to transmit therethrough and be incident in the first direction. The gain and Raman medium receives the pumping light from the first optical component and generates a first infrared base laser light having a first wavelength and a second infrared base laser light having a second wavelength. The first and second optical components form a laser cavity for oscillation of these two infrared base laser lights. The sum frequency generation crystal receives the first and second infrared base laser lights and generates a first visible laser light having a third wavelength. The first second-harmonic generation crystal receives the first infrared base laser light and generates a second visible laser light having a fourth wavelength. The second optical element allows the first and the second visible laser lights to emit out along the first direction. The gain and Raman medium has a first high transmittance for a first wave band covering the first and the second wavelengths in the second direction and a first high reflectivity for a second wave band covering the third and the fourth wavelengths in the second direction.

In accordance with another aspect of the present invention, a linear cavity for generating a high power visible laser light is provided. Along a first direction, the linear cavity comprises a first optical component allowing a pumping light incident in the first direction to transmit therethrough; a gain and Raman medium receiving the pumping light from the first optical component, and generating a first infrared base laser light having a first wavelength and a second infrared base laser light having a second wavelength; a first lithium triborate (LBO) crystal receiving the first and the second infrared base laser lights and generating a first visible laser light having a third wavelength; and a second optical component allowing the first visible laser light to emit out thereof along the first direction, wherein the gain and Raman medium has a first high transmittance for a first wave band covering the first and the second wavelengths in a second direction opposite to the first direction and a first high reflectivity for a second wave band covering the third wavelength in the second direction.

In accordance with yet another aspect of the present invention, a method for generating a multi-wavelength laser light including a first visible laser light having a first wavelength and a second visible laser light having a second wavelength is provided. The method includes the steps of providing a first optical component to allow a pumping light incident in a first direction to transmit therethrough; providing a second optical component; sequentially disposing a gain and Raman medium, a first lithium triborate (LBO) crystal and a second LBO crystal along the first direction between the first and the second optical components; generating a first infrared base laser light having a third wavelength and a second infrared base laser light having a fourth wavelength using the pumping light by the gain and Raman medium; generating the first visible laser light via the first LBO crystal; generating the second visible laser light via the second LBO crystal; allowing the first and the second visible laser lights to transmit along the first direction, and allowing the first and the second infrared base laser lights to be reflected along a second direction opposite to the first direction by the second optical component; and substantially reflecting the first and the second visible laser lights while substantially transmitting the first and the second infrared base laser lights through a surface of the gain and Raman medium in the second direction.

The Raman laser for generating high-power and multiple-wavelength laser light with visible wavelengths provided by the present invention can be applied usefully in supporting medical operations or industrial productions. Thus, the present invention has utility for industry.

The objectives and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; they are not intended to be exhaustive or to be limited to the precise form disclosed.

Figure 1:
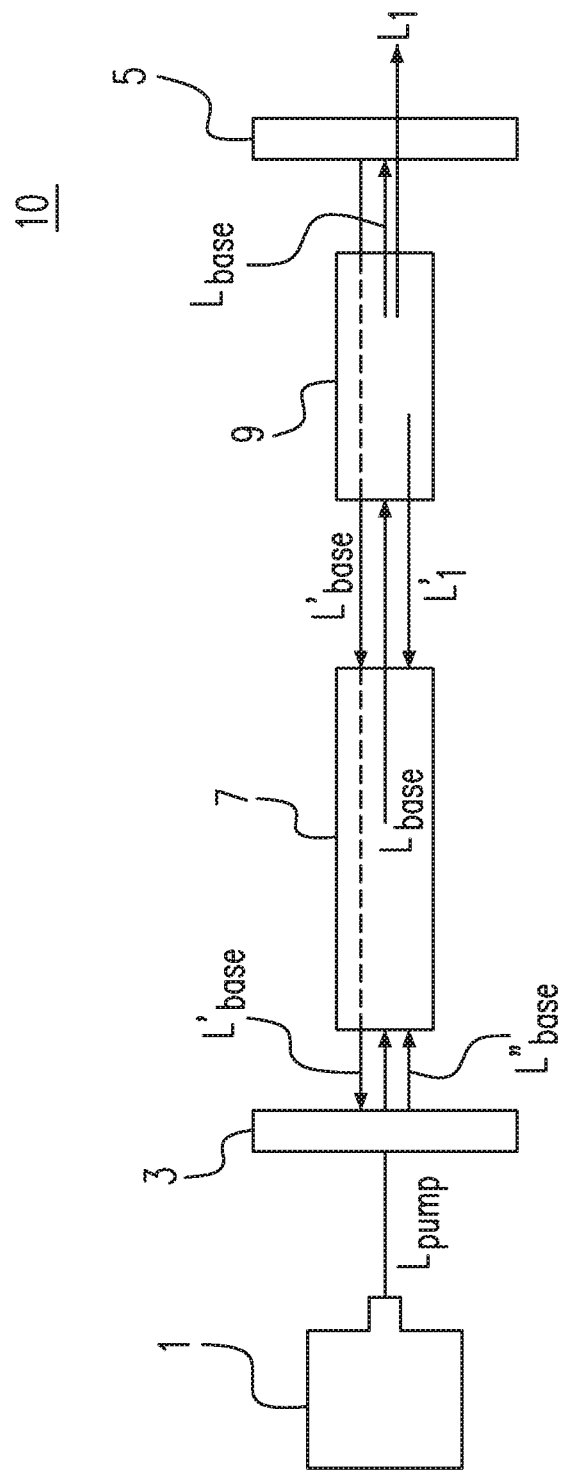
FIG. 1 is a schematic diagram showing a laser device for generating laser light of visible wavelengths.
Figure 2A:
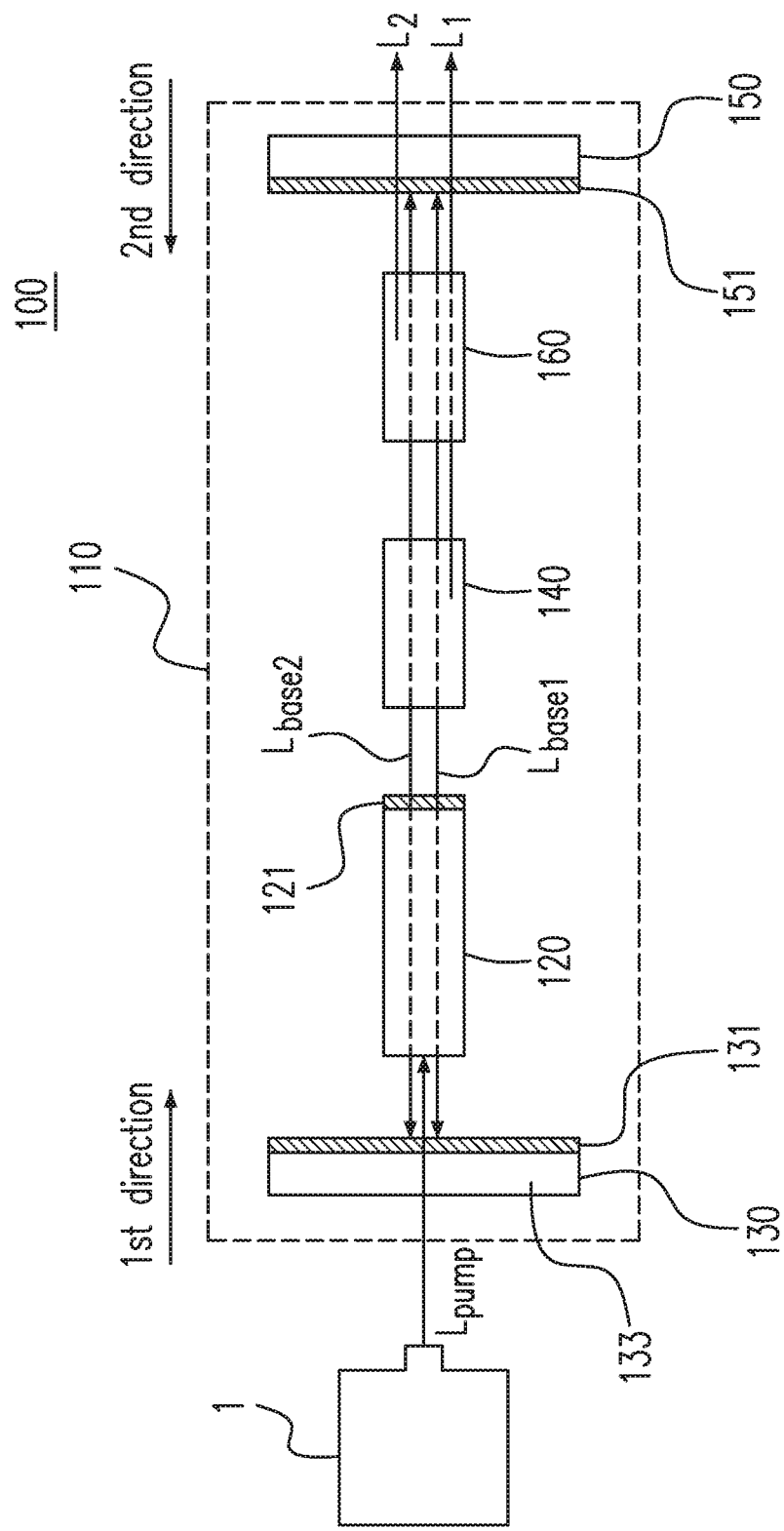
FIG. 2A is a schematic diagram showing a Raman laser for generating high-power and multiple-wavelength laser light with visible wavelengths according to one embodiment of the present invention.

Please refer to FIG. 2A, which shows a Raman laser for generating high-power and multiple-wavelength laser light with visible wavelengths according to one embodiment of the present invention. The present invention utilizes an infrared base laser light of another wavelength generated due to the Raman effect and travelling to and fro in the linear cavity to trigger visible laser light of different wavelengths. In the embodiments of FIGS. 2A-2D and 3-5, the infrared based laser lights of two different wavelengths is simultaneously generated in the resonant cavity due to the self-excited Raman phenomenon of the gain medium, and the embodiment in FIG. 2E, two different wavelengths of infrared base laser lights are generated by the gain medium and the Raman medium, respectively. Those skilled in the art may choose applicable component configurations according to their needs, without exceeding the scope of the present invention.

According to FIG. 2A, a high-power and multi-wavelength laser of visible light 100 has a linear cavity 110 having a first direction and a second direction opposite to the first direction. Along the first direction, the linear cavity 100 includes a first optical component 130, a gain and Raman medium 120, a sum frequency generation crystal 140, a first second-harmonic generation crystal 160 and a second optical element 150.

In one embodiment, the first optical component 130 can be an assembly made by placing an optical layer 131 on a lens 133. The first optical component 130 has high transmittance (for example, the reflectivity is lower than 0.2%) for a pumping light $L_{pump}$ (with a wavelength of 808 nm) incident along the first direction from a diode laser light source 1, and is good to be used for allowing the pumping light $L_{pump}$ to transmit therethrough and be incident in the first direction. The gain and Raman medium 120 receives the pumping light $L_{pump}$ from the first optical component 130, and generates a first infrared base laser light $L_{base1}$ having a first wavelength and a second infrared base laser light $L_{base2}$ having a second wavelength. For example, a diode laser light source provides an incident pumping light $L_{pump}$ with a wavelength of 808 nm. The gain and Raman medium 120 includes neodymium doped vanadate (for example, Nd:YVO$_4$), which not only can absorb the energy of the pumping light $L_{pump}$ via the doped material and convert it to a first infrared base laser light $L_{base1}$ having a wavelength of about 1064 nm, but also can rely on self-stimulated Raman scattering to generate a second infrared base laser light $L_{base2}$ having a wavelength of approximately 1176 when the reflectivity of the first optical element 130 and the second optical element 150 of the linear cavity 110 for the first infrared base laser light $L_{base1}$ reaches 99.8% or more, that is, when the first infrared base laser light $L_{base1}$ can be effectively locked in the linear cavity 110 to form a standing wave.

These two basic laser lights existing in the linear cavity 110 can be used as a means of forming laser light with different wavelengths of visible lights. From another point of view, the first infrared base laser light $L_{base1}$ and the second infrared base laser light $L_{base2}$ are reflected back and forth among the linear cavity 110, and the distance between the first optical element 130 and the second optical element 150 is such that the two basic laser lights form a standing wave to maintain a certain power thereof.

The sum frequency crystal 140 can be a lithium triborate (LBO) crystal formed with a particular cutting angle. The sum frequency crystal 140 receives the first and second infrared base laser light $L_{base1}/L_{base2}$ from the gain and Raman medium 120, and generates a first visible laser light L1 having a third wavelength. For example, in the aforementioned embodiment, when the wavelengths of the first and second infrared base laser light $L_{base1}/L_{base2}$ are 1064 and 1176 nm respectively, the first visible laser light L1 generated by the sum frequency crystal 140 has a wavelength of about 559 nm.

The first second-harmonic generation crystal 160 is a lithium borate crystal (LBO) crystal formed with another special cutting angle different from that for the sum frequency crystal 140, receives the first infrared base laser light $L_{base1}$ passing through the sum frequency crystal 140, and generates a second visible laser light L2 having a fourth wavelength. According to the above example, when the first infrared base laser light $L_{base1}$ has a wavelength of about 1064 nm, the second visible laser light L2 generated by the first second-harmonic generation crystal 160 via frequency doubling has a wavelength of about 532 nm.

According to an embodiment of the present invention, the second optical element 150 is a lens having an optical film on the surface facing the first direction, and have not only high reflectivity up to 99.8% for the lights with the wavelength within a range covering those of the first and second infrared base laser light $L_{base1}/L_{base2}$ (for example, 1060-1180 nm), but also high penetration or low reflectivity as low as less than 0.3% for the lights with the wavelength within a range covering those of the first and second visible laser light L1/L2 (for example, 530-590 nm), so that the first and second visible laser light L1/L2 are emitted in the first direction. Laser lights with wavelengths of 532 and 559 nm are of different color in the visible range and of great value in medical applications such as retinal photocoagulation in the fields of ophthalmology and dermatology. The high-power laser cavity 110 of the present invention can simultaneously provide two or more kinds of visible laser light, which is an important breakthrough.

According to the embodiment shown in FIG. 2A, an optical film 121 is disposed on the surface of the gain and the Raman medium 120 facing the second direction in order to prevent the first and second visible laser lights L1/L2 from entering the gain and the Raman medium 120 from the second direction, such that the gain and the Raman medium 120 in the second direction is highly reflective (for example, 95% or higher reflectivity) for the light with the wavelength within a range covering those of the first and second visible laser lights L1/L2 (for example, 530-590 nm). Meanwhile, the gain and the Raman medium 120 in the second direction has high penetration (for example, reflectivity of 0.3% or less) for the lights whose wavelengths are within a wavelength band covering the wavelengths of the first and second infrared base laser light $L_{base1}/L_{base2}$ (for example, 1060-1180 nm). In this way, the first infrared base laser light $L_{base1}$ can continue to pass through the gain and Raman medium 120 to generate the second infrared base laser light Lbase2 having a wavelength of about 1176 nm by means of the self-excited Raman scattering, while the first and second visible laser lights L1/L2 are reflected back and transmitted in the first direction. According to the configuration of the present invention, the gain and Raman medium 120 will not be interfered with by the first and second visible laser lights L1/L2, so the power of the cavity 110 can be maintained under a preferred condition.

FIGS. 2B-2E show some different embodiments of high-power and multi-wavelength visible Raman lasers in accordance with the present invention, similar to that in FIG. 2A. The Raman laser 100 includes a linear cavity 110 having a first direction and a second direction opposite to the first direction. Along the first directions, the first optical element 130, the gain and the Raman medium 120, the sum frequency crystal 140, the first second-harmonic generation crystal 160, and the second optical element 150 are disposed. The differences are that the first optical element 130 and the gain and Raman medium 120 are implemented in a variety of slightly different component configurations.

Figure 2B:
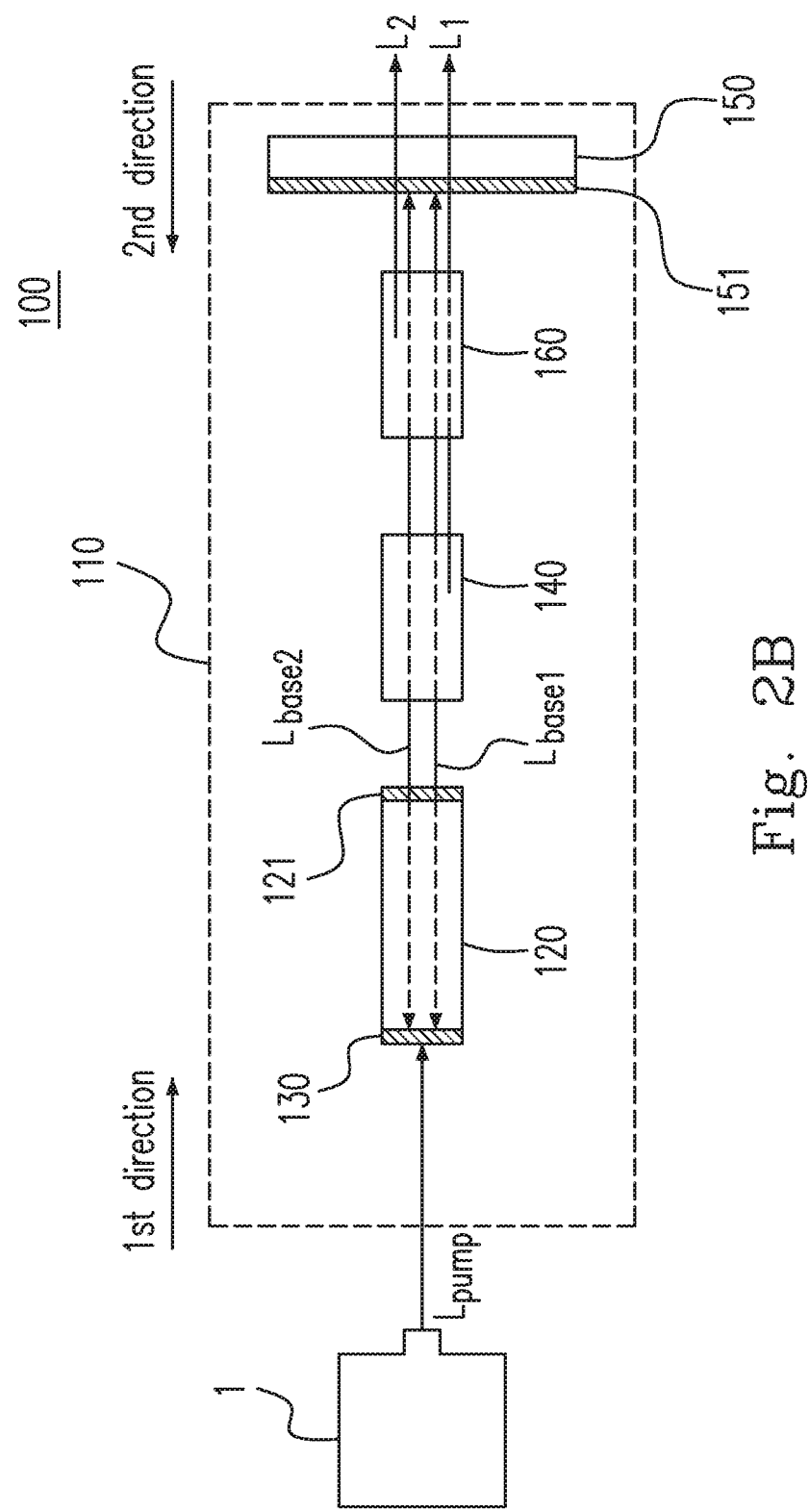
FIGS. 2B-2E are schematic diagrams showing the Raman laser for generating high-power and multiple-wavelength laser light with visible wavelengths according to other embodiments of the present invention.

In the embodiment shown in FIG. 2B, the first optical element 130 is configured in the form of an optical film on the surface of the gain and the Raman medium 120 facing the first direction, and thus the lens 133 in FIG. 2A can be eliminated. As a result of reducing the number of components, the optical path loss in the linear cavity 110 can be further reduced.

Figure 2C:
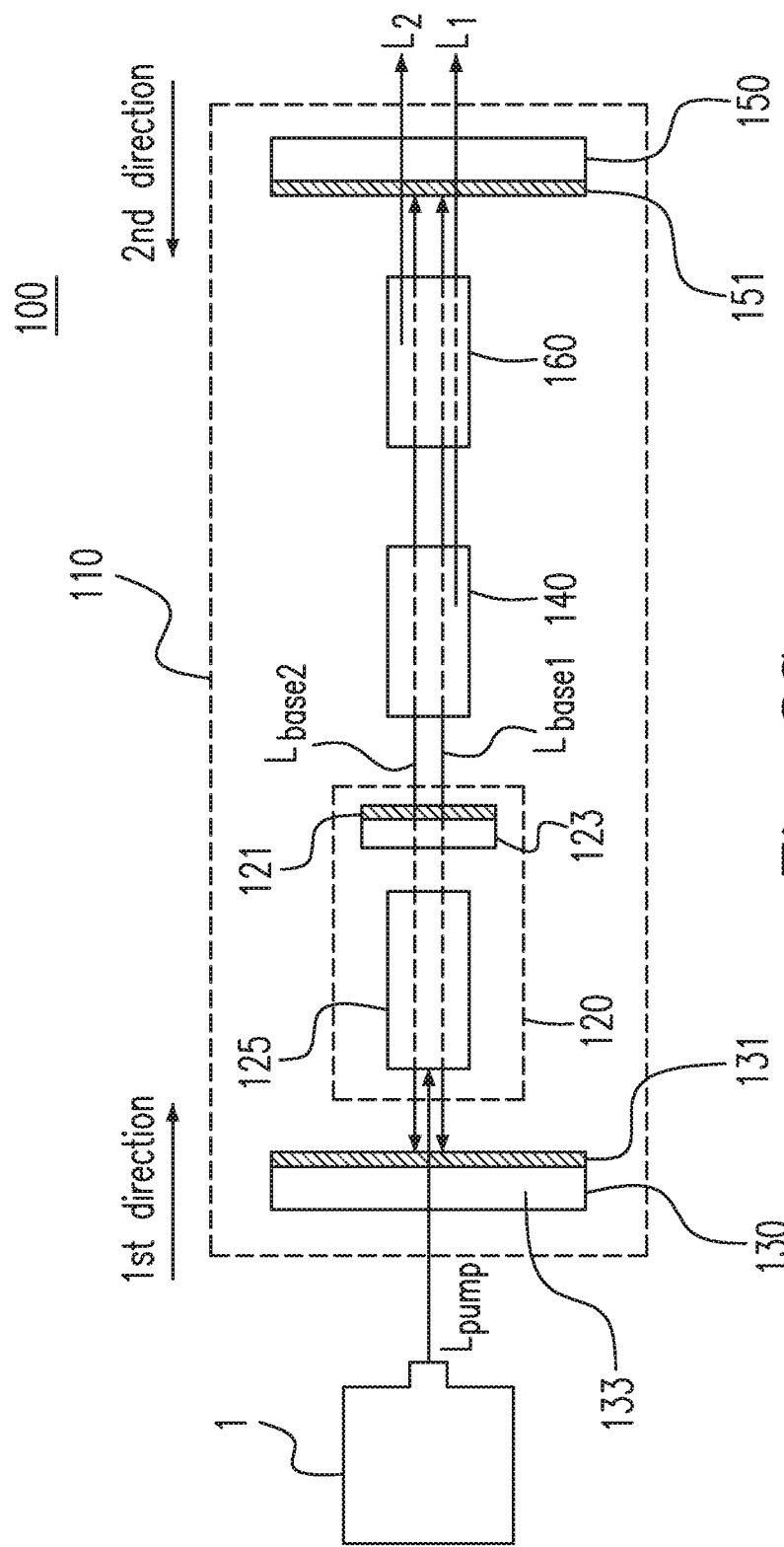

In the embodiment shown in FIG. 2C, the first optical element 130 is configured in the same manner as the first optical element 130 shown in FIG. 2A, and the optical film 121 for filtering the light entering the gain and Raman medium 120 from the second direction is disposed on a lens 123 located between the gain and Raman medium 125 without an optical film and the sum frequency crystal 140. The combination of elements 121, 123, and 125 in the figure constitutes a gain and Raman medium 120. With such a component arrangement, the component arrangement of the linear cavity 110 is highly flexible since the respective optical films 131/121/151 are respectively disposed on separate lenses, and the optical films can be replaced at any time as needed.

Figure 2D:
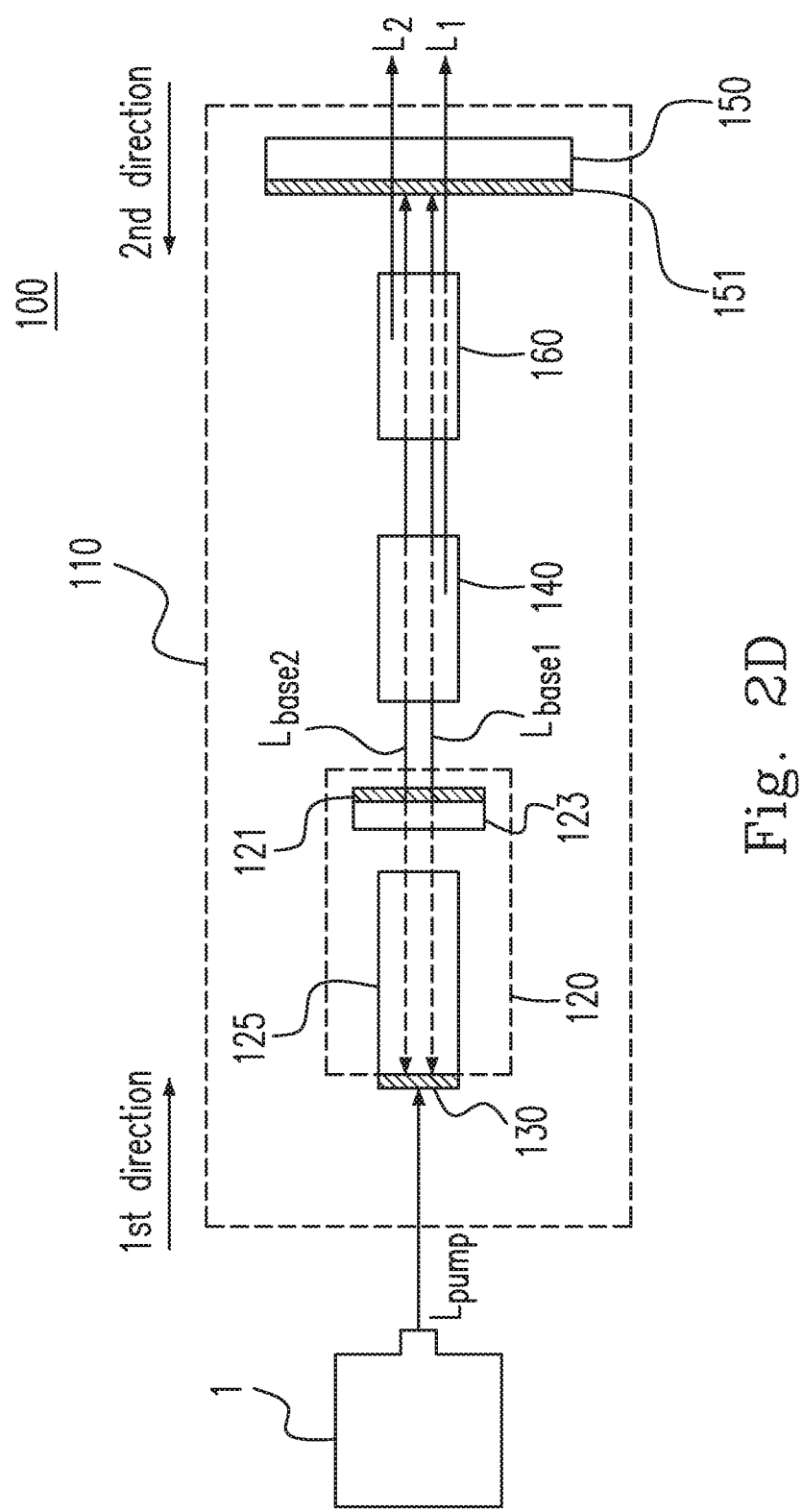

In the embodiment shown in FIG. 2D, the first optical element 130 is configured in the form of an optical film on the surface of the gain and Raman medium 120 facing the first direction.

Figure 2E:
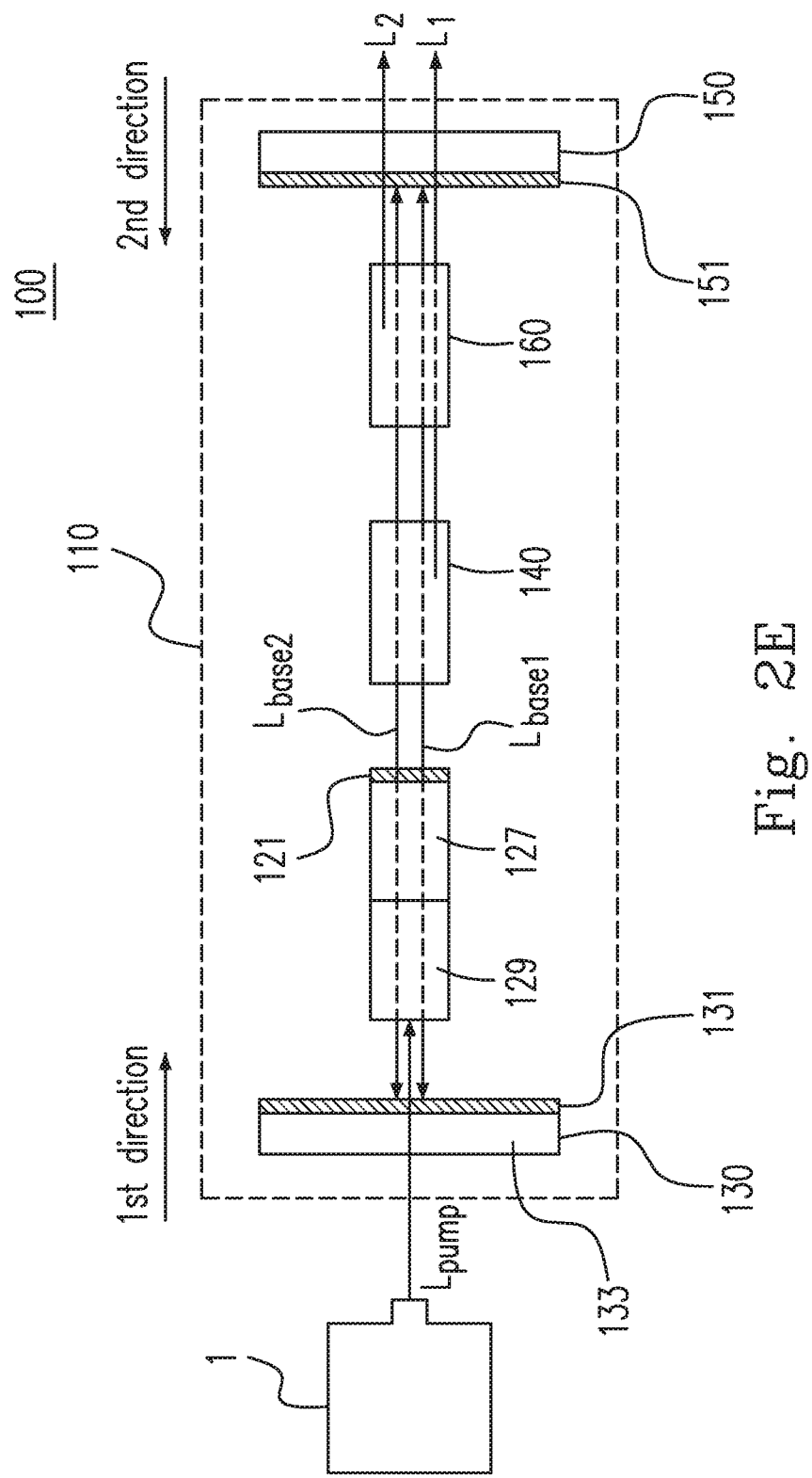

In the embodiment shown in FIG. 2E, the functions of the gain and the Raman medium 120 can be realized by a combination of the gain medium 129, the Raman medium 127, and the optical film 121. The gain medium 129 may be a neodymium-doped yttrium aluminum garnet (Nd:YAG) crystal, which can convert a pump light $L_{pump}$ having a wavelength of 808 nm into a first infrared base laser light $L_{base1}$ having a wavelength of about 1064 nm. The Raman medium 127 contains neodymium-doped vanadate (for example, neodymium-doped yttrium vanadate Nd:YVO4) which can generate Raman-scattering due to excitation of the first infrared-based laser light $L_{base1}$ having a wavelength of about 1064 nm, and generate a second infrared base laser light $L_{base2}$ having a wavelength of approximately 1176 nm.

Figure 3:
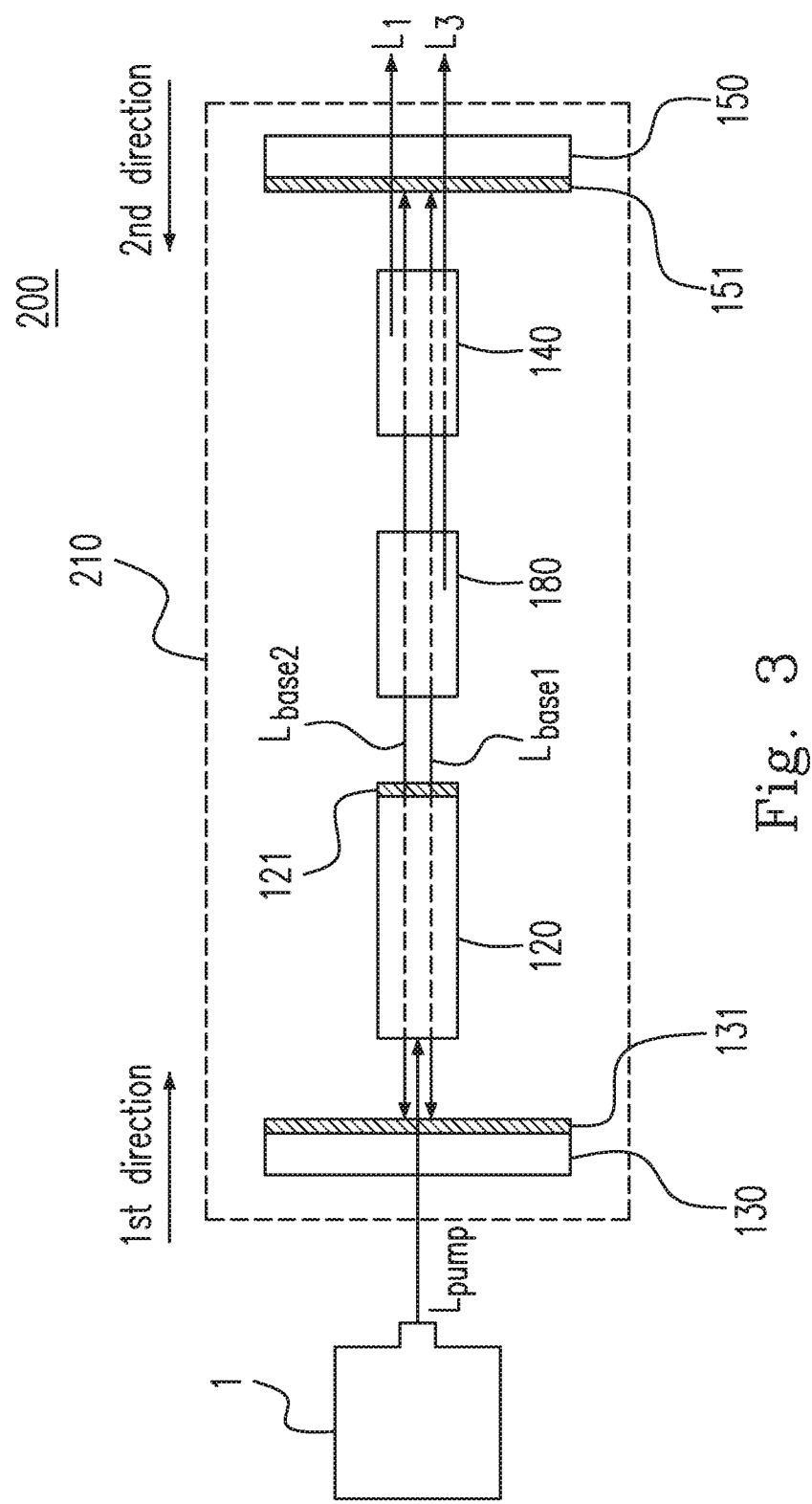
FIG. 3 is a schematic diagram showing a Raman laser for generating high-power and multiple-wavelength laser light with visible wavelengths according to one other embodiment of the present invention.

Please refer to FIG. 3, where another embodiment of a high-power and multi-wavelength visible Raman laser in accordance with the present invention is shown. As illustrated, the high-power and multi-wavelength visible light Raman laser 200 comprises a linear cavity 210 having a first direction and a second direction opposite to the first direction. Along the first direction, an optical component 130, a gain and Raman medium 120, a second second-harmonic generation crystal 180, a sum frequency crystal 140, and a second optical component 150 are arranged.

The second second-harmonic generation crystal 180 is a lithium borate crystal (LBO) crystal formed with yet another special cutting angle different from that for the sum frequency crystal 140 and the first second-harmonic generation crystal 160, receives the second infrared base laser light $L_{base2}$ from the gain and Raman medium 120, and generates a third visible laser light L3 having a fifth wavelength. According to the above example, when the second infrared base laser light $L_{base2}$ has a wavelength of about 1176 nm, the third visible laser light L3 has a wavelength of about 588 nm which lies within the wavelength band covering the wavelengths of the first and the second visible laser lights L1/L2 (such as 530-590 nm). The property and functions of the sum frequency crystal 140 are the same as those in the aforementioned embodiments, and therefore there is no need to repeat the information.

Since the intensity of the second infrared base laser light $L_{base2}$ generated by Raman scattering is much lower than that of the first infrared base laser light $L_{base1}$, in order to make the two or more visible laser lights generated have a similar power to meet the need of industrial applications, it is necessary to consider the strength of the two basic laser lights and choose appropriate positions along the first direction of the linear cavity of the present invention for different lithium borates (LBO) crystals. In the embodiments as shown in FIGS. 2A-2E, the sum frequency crystal 140 needs to be disposed ahead of the first frequency doubling crystal 160 along the first direction, so that the second infrared base laser light $L_{base2}$ which is relatively weaker can directly enter the sum frequency crystal 140 to generate the first visible laser light L1, and the first infrared base laser light $L_{base1}$ passing through the sum frequency crystal 140 and partially absorbed, the intensity of the remaining laser light is still high enough for the first second-harmonic crystal 160 to generate the second visible laser light L2 having sufficient power. In contrast, in the embodiment in FIG. 3, the sum frequency crystal 140 needs to be disposed after the second frequency doubling crystal 180 in the first direction, so that the second infrared base laser light $L_{base2}$ which is relatively weaker can directly enter the second second-harmonic crystal 180.

Figure 4:
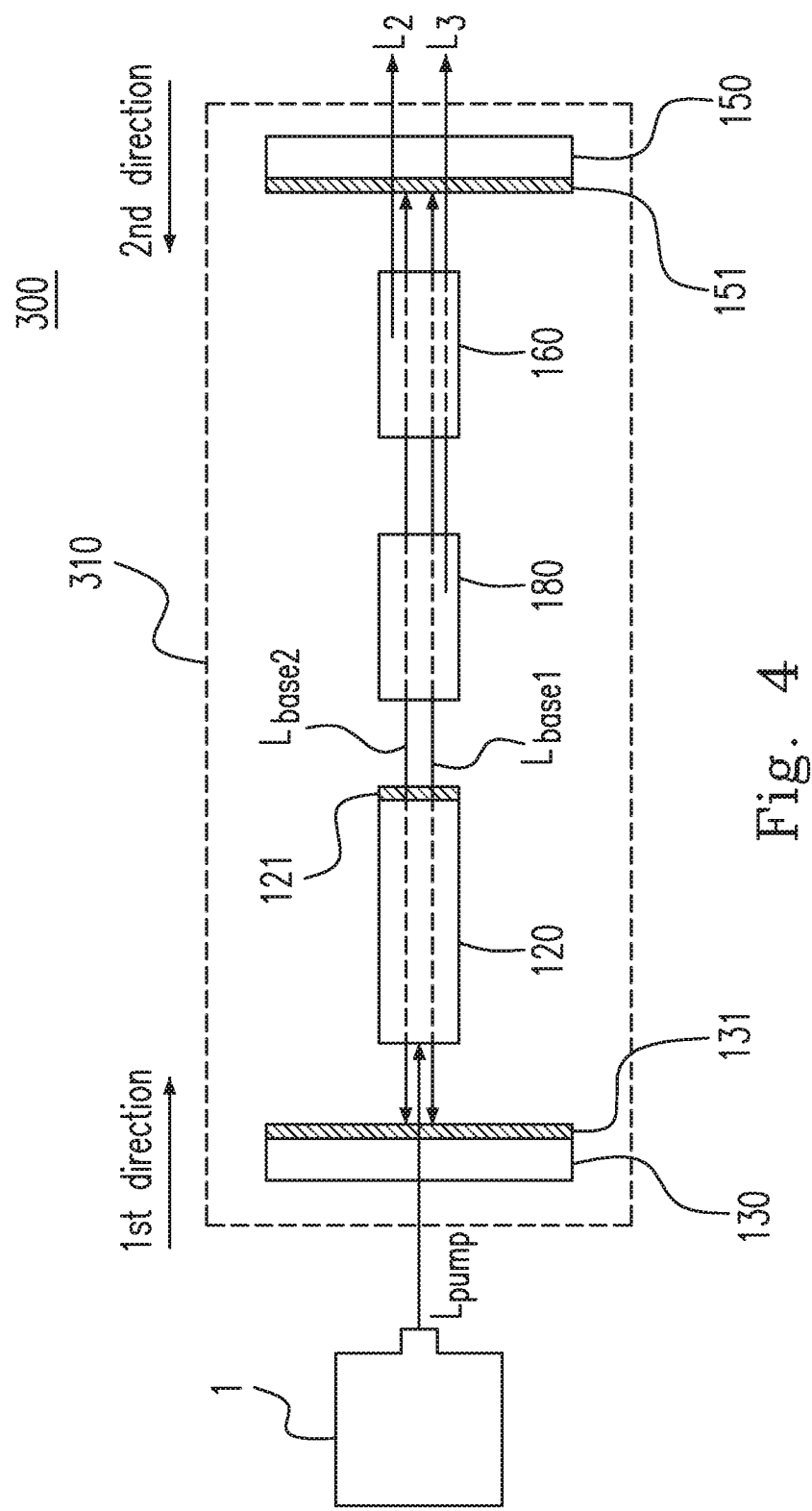
FIG. 4 is a schematic diagram showing a Raman laser for generating high-power and multiple-wavelength laser light with visible wavelengths according to one other embodiment of the present invention.

Please refer to FIG. 4, which is a schematic diagram of a high-power and multi-wavelength visible Raman laser 300 according to another embodiment of the present invention. In accordance with the same concept set forth above, those skilled in the art can appreciate that if a second visible laser light L2 having a fourth wavelength and a third visible laser light L3 having a fifth wavelength are desired, one may alternatively dispose the second second-harmonic crystal 180 in front of the first second-harmonic crystal 160 along the first direction in the linear cavity.

Figure 5:
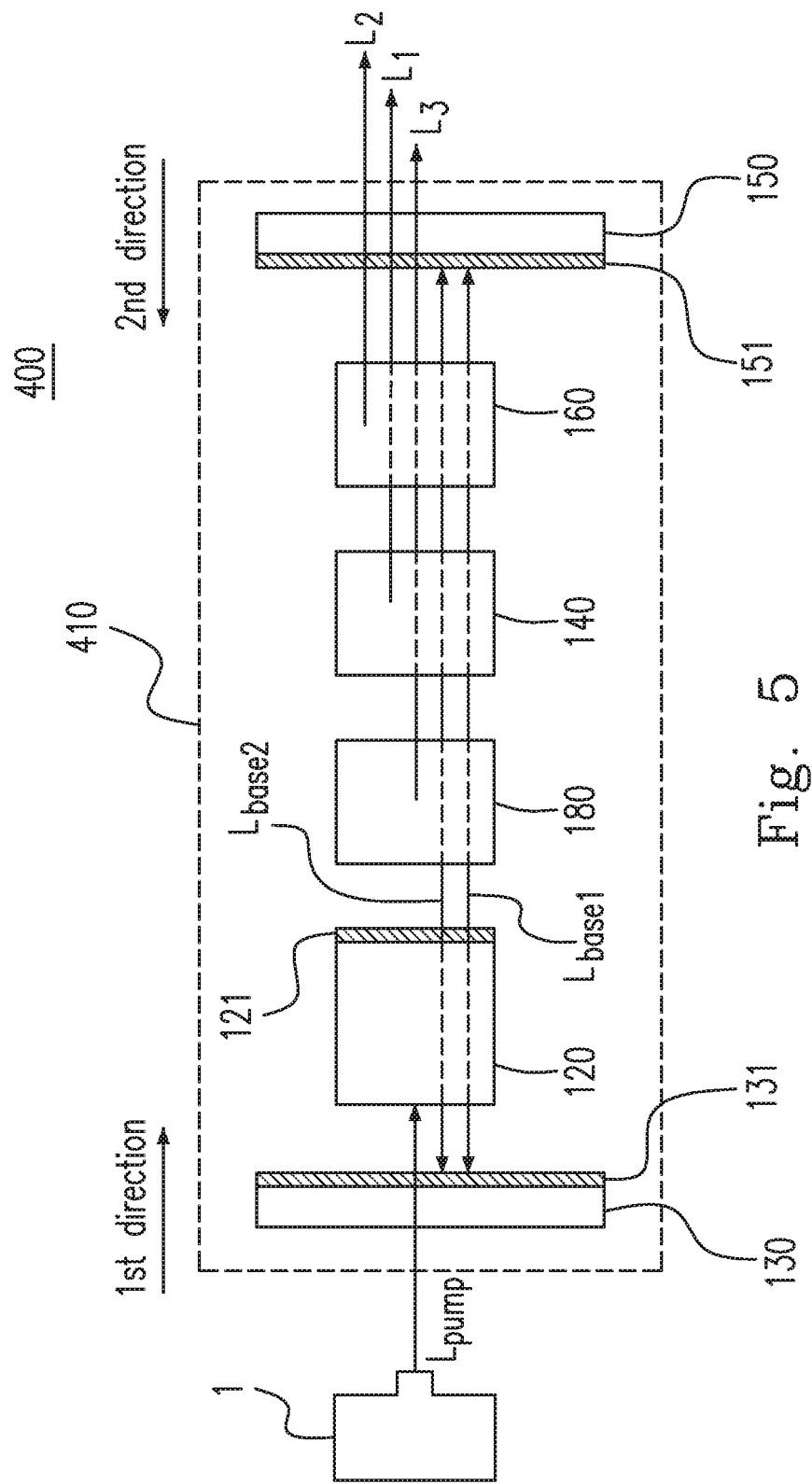
FIG. 5 is a schematic diagram showing a Raman laser for generating high-power and multiple-wavelength laser light with visible wavelengths according to yet another embodiment of the present invention.

Please refer to FIG. 5, which is a schematic diagram showing a Raman laser 400 for generating high-power and multiple-wavelength laser light with visible wavelengths according to yet another embodiment of the present invention. According to FIG. 5, a high-power and multi-wavelength laser of visible light 400 has a linear cavity 410 having a first direction and a second direction opposite to the first direction. Along the first direction, the linear cavity 410 includes the first optical component 130, the gain and Raman medium 120, the second second-harmonic crystal 180, the sum frequency generation crystal 140, the first second-harmonic generation crystal 160 and the second optical element 150. The technical features of the elements are the same as those described in the previous sections, so there is no need to repeat the information.

In order to simultaneously obtain visible laser lights L1/L2/L3 of three different wavelengths, three types of frequency modulation crystals, which are the second second-harmonic crystal 180, the sum frequency crystal 140, and the first second-harmonic crystal 160 can be sequentially arranged in the linear cavity, so that the first/second/third visible laser lights L1/L2/L3 can be generated by means of frequency doubling or sum frequency under the condition that the first and second infrared-based laser lights $L_{base1}/L_{base2}$ generated by the gain and Raman medium 120 are continuously transmitted to and fro between the first optical element 130 and the second optical element 150.

Based on the above, in accordance with another aspect of the present invention, a linear cavity for generating a high power visible laser light is provided. Along a first direction, the linear cavity comprises a first optical component 130 allowing a pumping light $L_{pump}$ incident in the first direction to transmit therethrough, a gain and Raman medium 120 receiving the pumping light $L_{pump}$ from the first optical component 130 and generating a first infrared base laser light $L_{base1}$ having a first wavelength and a second infrared base laser light $L_{base2}$ having a second wavelength, a first LBO crystal receiving the first and the second infrared base laser lights $L_{base1}/L_{base2}$ and generating a first visible laser light L1 having a third wavelength and a second optical component 150 allowing the first visible laser light to emit out thereof along the first direction.

In addition, the gain and Raman medium 120 has high transmittance for the lights with wavelengths in the first wave band covering the first and the second wavelengths in a second direction opposite to the first direction and high reflectivity for the lights with wavelengths in the second wave band covering the third wavelength in the second direction. The first optical component 130 has high reflectivity for the lights with wavelengths in the first wave band in the second direction and high reflectivity for the lights with wavelengths in the second wave band in the second direction. The second optical component 150 has high transmittance for the second wave band in the first direction and high reflectivity for the first wave band in the first direction.

The linear cavity of the present invention can generate high-power laser light. The first visible laser light L1 described above is only an example, and the LBO crystal used as the sum frequency crystal 140 in the aforementioned embodiments is configured to obtain the first visible laser light L1 via the sum frequency effect. The users may configure different LBO crystals as frequency-doubling crystals to obtain visible laser lights having different wavelengths, or simultaneously dispose a plurality of LBO crystals between the gain and Raman medium 120 and the second optical elements 150 along the first direction in the linear cavity so as to simultaneously obtain visible laser lights having different wavelengths.

Figure 6:
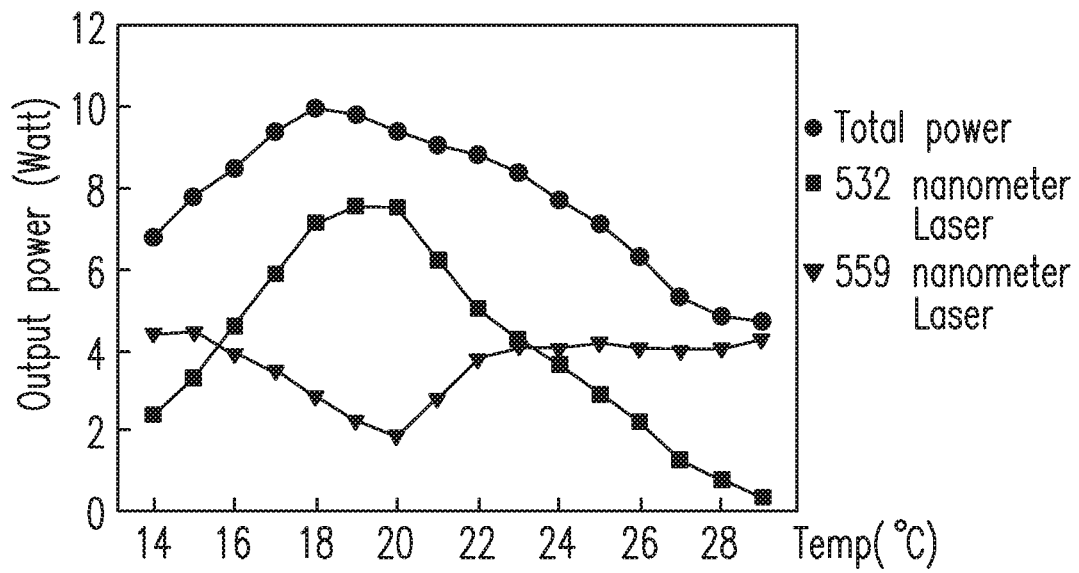
FIG. 6 is a schematic diagram showing the output power of the laser device made in accordance with the embodiment of FIG. 2A at different operating temperatures.

FIG. 6 shows the output power of the laser device made in accordance with the embodiment of FIG. 2A at different operating temperatures. Based on the data shown in the figure, it is understood that, when the room temperature is in the range of 14-28 degrees Celsius, the power of the visible laser lights with two different wavelengths generated by the laser device is kept at the watt level, which can meet the needs of the industry. When the operating temperature is about 20 degrees Celsius, the visible laser light with wavelength of 532 nm reaches the highest output power while the output power of the visible laser light with wavelength of 559 nm is the lowest. When the operating temperature is around 16 and 23 degrees Celsius, the output power of visible laser lights with two different wavelengths is almost 4 watts. Notably, the test data shown in FIG. 6 is made by using a laser light of 31.6 watts as the pumping light.

The data shows that the laser device according to the present invention can provide multi-wavelength visible laser lights having output power of several watts with the supply of pumping light of about 30 watts. Because the power of the visible lasers generated by different LBO crystals at different temperatures are different, according to an embodiment of the present invention, the output power of the first visible laser light and the second visible laser light can be adjusted by controlling the operating temperature. For example, when the powers of the two laser lights for use needs to be close, the operating temperature can be controlled at around 16 or 23 degrees Celsius; if the power of the laser light with wavelength of 532 nm is required to be higher than that of the laser light with wavelength of 559 nm, the temperature can be controlled at between 16 and 23 degrees Celsius, preferably at around 20 degrees Celsius.

Figure 7:
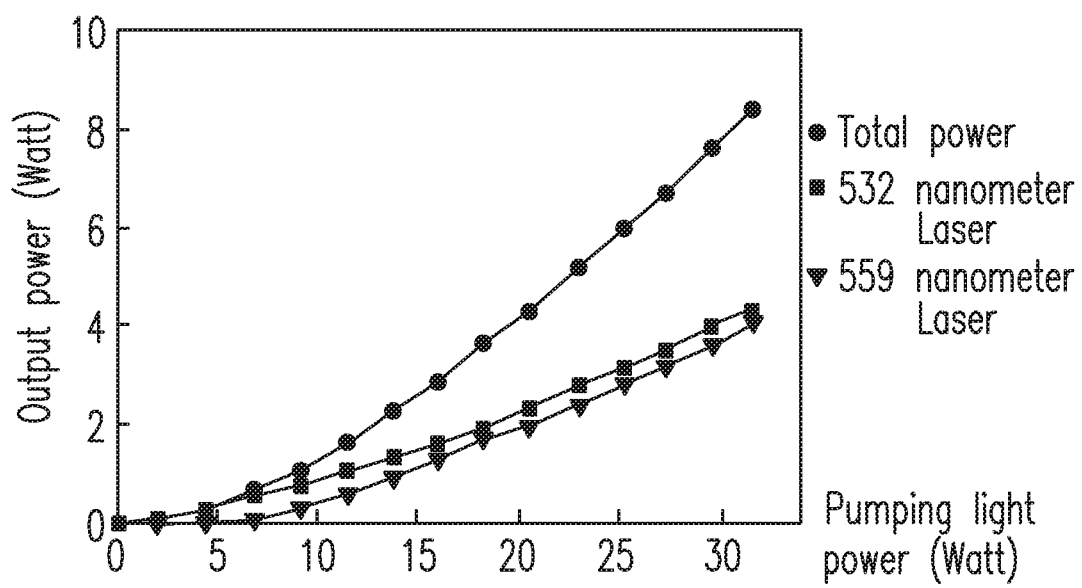
FIG. 7 is a schematic diagram showing the input and output powers for a laser device made in accordance with the embodiment of FIG. 2A at room temperature.

Referring to FIG. 7, where the input and output powers for a laser device made in accordance with the embodiment of FIG. 2A at the room temperature of 23 degrees Celsius are illustrated. When the power of the incident pumping light exceeds 10 watts, the total output power reached the level of the watt level, and when the power of the incident pumping light is close to 32 watts, output powers of the visible laser lights with wavelength of 532 nm and 559 nm both reach 4 watts, and the total output power reaches 8 watts.

Through the abovementioned embodiments, the Raman laser for generating high-power and multiple-wavelength laser lights with visible wavelengths according to the present invention may use the linear resonance cavity under the same configuration, and can obtain high-power visible laser lights with different wavelengths by means of different device arrangement, which is a technology breakthrough.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for generating a multi-wavelength laser light including a first visible laser light having a first wavelength and a second visible laser light having a second wavelength, the method comprising steps of:
    providing a first optical component to allow a pumping light incident in a first direction to transmit therethrough;
    providing a second optical component;
    sequentially disposing a gain and Raman medium, a first lithium triborate (LBO) crystal and a second LBO crystal along the first direction between the first and the second optical components;
    generating a first infrared base laser light having a third wavelength and a second infrared base laser light having a fourth wavelength using the pumping light by the gain and Raman medium;
    generating the first visible laser light via the first LBO crystal;
    generating the second visible laser light via the second LBO crystal;
    allowing the first and the second visible laser lights to transmit along the first direction, and allowing the first and the second infrared base laser lights to be reflected along a second direction opposite to the first direction by the second optical component;
    substantially reflecting the first and the second visible laser lights while substantially transmitting the first and the second infrared base laser lights through a surface of the gain and Raman medium in the second direction; and
    adjusting a power of the first and the second visible laser lights under an operation temperature between 14 to 28 degrees Celsius, wherein the power of the first and the second visible laser lights is kept at a watt level while the first and the second wavelengths remain unchanged.

2. The method according to claim 1, wherein the second infrared base laser light is generated via a self-stimulated Raman scattering, and at least one of the first and the second LBO crystals is a second-harmonic generation crystal.

3. The method according to claim 1, wherein the first and the second LBO crystals are used as a sum frequency generation crystal and a second-harmonic generation crystal respectively when the third wavelength is twice the first wavelength.

4. The method according to claim 3, wherein the first and the second wavelengths are 559 and 532 nanometers respectively.

5. The method according to claim 1, wherein the first and the second LBO crystals are used as a second-harmonic generation crystal and a sum frequency generation crystal respectively when the fourth wavelength is twice the first wavelength.

6. The method according to claim 5, wherein the first and the second wavelengths are 588 and 559 nanometers respectively.

7. The method according to claim 1, further comprising:
    disposing a third LBO crystal between the gain and Raman medium and the first LBO crystal, wherein the third LBO is configured to receive the first and the second infrared base laser lights from the first and the second LBO crystals and generate a third visible laser having a fifth wavelength.

* * * * *